Figure 1:
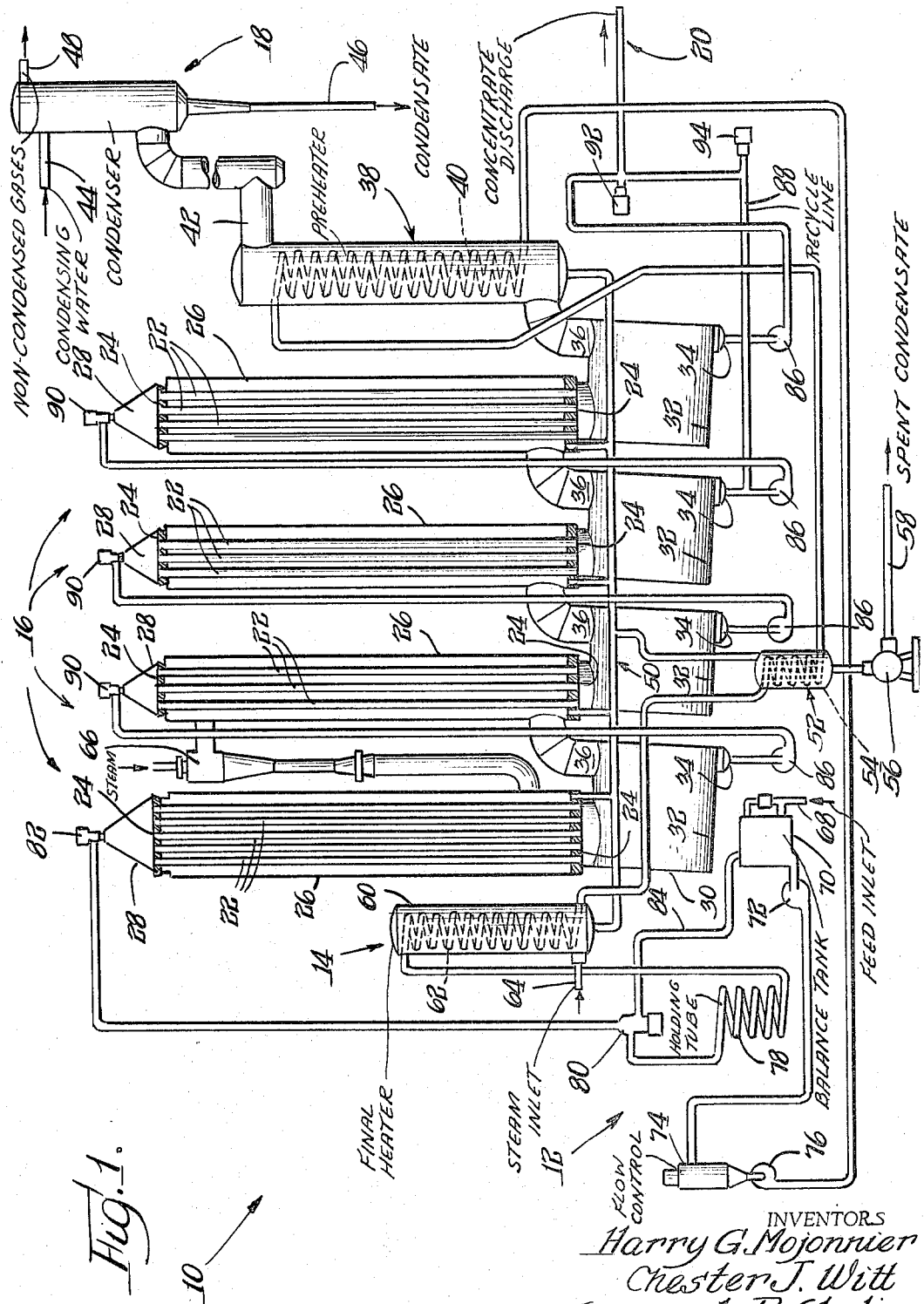

INVENTORS
Harry G. Mojonnier
Chester J. Witt
Sigmund P. Skoli
By Olson, Trexler, Wolters & Bushnell attys

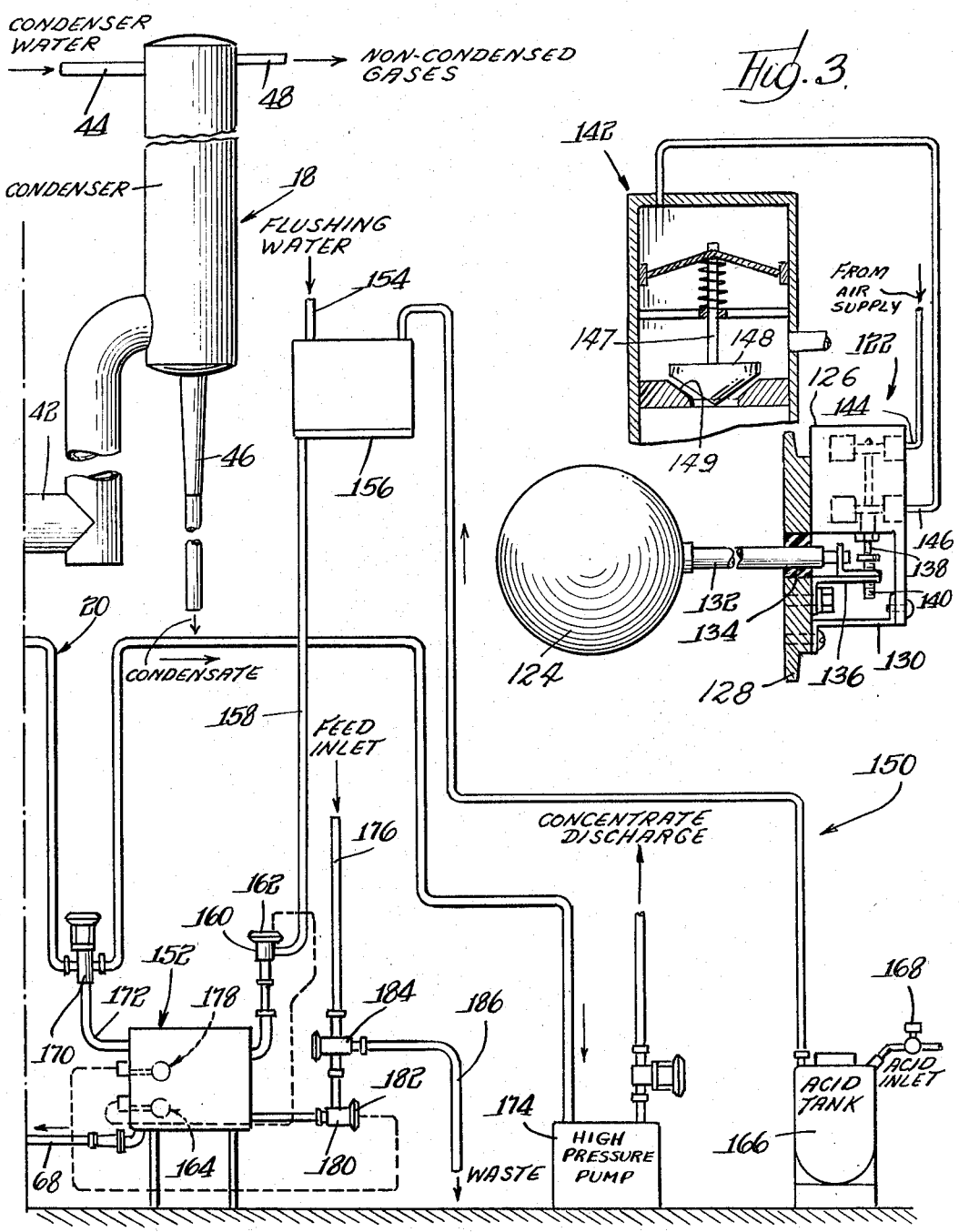

United States Patent Office 3,286,764
Patented Nov. 22, 1966

3,286,764
FLOW CONTROL FOR A MULTIPLE-EFFECT EVAPORATOR
Harry G. Mojonnier, River Forest, Chester J. Witt, Deerfield, and Sigmund P. Skoli, Elmwood Park, Ill., assignors to Mojonnier Bros. Co., Chicago, Ill., a corporation of Illinois
Filed Mar. 26, 1964, Ser. No. 354,971
5 Claims. (Cl. 159—44)

This invention relates generally to multiple-effect evaporators and more particularly to means for regulating the flow through such apparatus.

Single-pass falling-film evaporators have become popular for concentrating a variety of products; and ordinarily, the equipment is arranged to include two or more effects whereby to achieve greater steam efficiency. Centrifugal pumps are conventionally employed in conveying the condensed product from one effect to the next; and since centrifugal pumps are characteristically variable in their output, loss of inlet head, as might be experienced for example upon initiating operation, permits the pump to operate in the absence of liquid resulting in damage to the bearings and other component parts. To prevent such undesirable operation and to preserve a more nearly uniform rate of product flow through the several effects, it has been common practice heretofore to provide a metering device, of either the fixed or the manually adjustable type, in the pump at the discharge line thereof. The orifice of such a metering device is ordinarily designed specifically to establish proper flow of the product being concentrated. However, the rate of flow of cleaning solutions is generally much greater than that of the product. Hence, pumps incorporating fixed metering orifices that are tailored to the requirements of product flow are unsuitable for circulating cleaning solutions. Separate pumps are conventionally utilized therefore for conveying the cleaning solutions; and separate pumps are preferred to metering devices having a variable orifice because of the substantial inconveniences involved in regulating the latter devices each time that there is a change in the feed from product to cleaning solution or vice versa.

Therefore, an important object of the present invention is to provide a flow control system for an evaporator effect wherein a single pump is used interchangeably to convey either an automatically regulated flow of product or a substantially greater flow of cleaning solution.

Another object of the invention is to provide a more economical evaporator installation.

Still another object of the invention is to provide an evaporator installation that is adapted to incorporate an integral cleaning system.

A further object of the invention is to provide a flow control for a multiple-effect evaporator wherein the feed to a subsequent effect is regulated by the liquid discharge from the preceding effect.

These and other objects and features of the invention will become more apparent from a consideration of the following disclosure.

A flow controlled evaporator system in accord with the invention includes a first evaporator effect having a separating chamber that is adapted to receive a variable flow of both liquid and vapor, there being a sump in the separating chamber for collecting the liquid. The system additionally includes a second evaporator effect which is adapted to receive a forced flow of the liquid from the sump of the first evaporator effect, the second evaporator effect including an infeed member. A centrifugal pump is connected in fluid circuit between the first and second evaporator effects, and a valve is coupled in fluid circuit between the centrifugal pump and the infeed member of the second evaporator effect. A control arrangement for the system includes a float member which is disposed in the sump of the first effect for sensing and responding to the liquid level therein, the control arrangement additionally including a valve regulator connected to the float member and to the valve member controlling the infeed to the second evaporator effect. This regulator selectively operates the valve in accordance with the liquid level in the sump whereby to reduce the flow to the second evaporator effect when the level of liquid in the sump of the first evaporator effect falls and vice versa.

Figure 2:
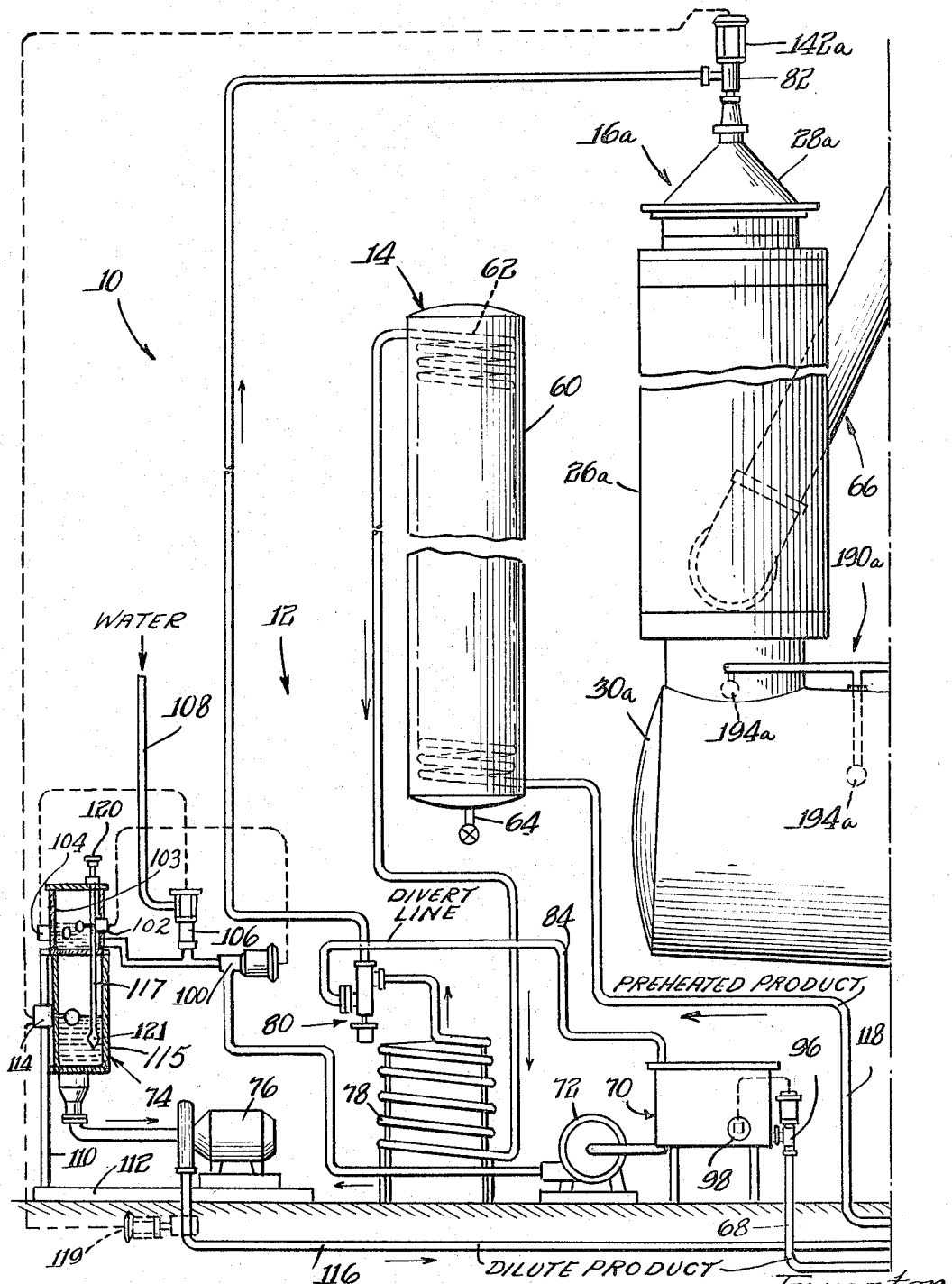

In order that the principles of the invention may be readily understood, a single embodiment thereof, applied to a milk evaporator but to which the application is not to be restricted, is shown in the accompanying drawings wherein:

FIG. 1 is a schematic flow diagram of a quadruple effect evaporator system constructed in compliance with the principles of the present invention;

FIGS. 2, 2A, 2B and 2C are sequentially arranged fragmentary views showing the apparatus of FIG. 1 in greater detail, additionally showing both the valve command connections and the integral cleaning system incorporated in the evaporator arrangement; and for purposes of simplification, FIGS. 2–2C omit the condensate connections to and from the regenerative heater; and FIG. 3 is a schematic view of a typical float member and valve regulator used in the evaporator system of the invention.

Referring now in detail to the drawings, specifically to FIG. 1, an evaporator arrangement 10 is shown as including a product feeding unit 12 which incorporates a final heater 14. The evaporator arrangement 10 also includes a plurality of evaporator effects 16, specifically four in number, a vapor-line condenser 18, and a concentrate discharge line 20. The arrangement 10 is adapted for single-pass falling-film operation; and multiple effects are employed in order to achieve improved steam economy, the vapor from one effect being employed as the heating medium for the immediately subsequent effect in the conventional manner. Each of the individual evaporator effects 16 is provided with a suitable bundle of radially spaced, vertically disposed tubes 22; and since the effects 16 are intended to pass product through the tubes 22 and to situate steam outside the tubes, horizontally disposed tube sheets 24 are employed at the upper and lower ends of the tubes and a cylindrical shell 26 is arranged to encompass each of the resulting structures. Each of the evaporator effects 16 also includes both an inverted, conical feed chamber or infeed member 28 communicating with the top end of the tubes 22 and a separating chamber 30 underlying the tubes for receiving a variable flow of both liquid product and vapor flashed from the product. The discharge from the tubes 22 is directed against a baffle 32 which forms the floor of the separating chamber 30, and the baffle 32 is declined toward a sump 34 which is thereby adapted to collect the liquid product.

The separating chamber 30 of the evaporator effect 16 that receives the product directly from the feeding arrangement 12 is constructed with a generously dimensioned vapor conduit 36 which leads the vapor flashed in the separating chamber into the region outside of the tubes 22 in the next succeeding evaporator effect. The next two succeeding effects are similarly arranged, and the last evaporator effect is fabricated so that its vapor conduit 36 leads into a vapor-line product preheater 38, the vapors passing exteriorly of a coil 40 which conveys the product. The preheater 38 is provided with a vapor discharge conduit 42 which is connected to the condenser 18, condenser 18 being advantageously constructed as a barometric, contact-type condenser receiving condensing water from an inlet line 44. Liquid is delivered from the condenser 18 to a sump or to a sewer under the influence of gravity and through an outlet line 46. In addition, non-condensed gases are extracted from the condenser 18 through a line 48 that leads to either an air ejector or a vacuum pump, not shown, in accordance with the vacuum requirements of the system. As will be recognized, the reduction of vapors to liquid in the condenser 18 forms a partial vacuum in the condenser which vacuum serves to draw the vapors through the interconnected effects 16. Condensate from the four evaporator effects 16, from the preheater 38 and the final heater 14 is drained by a piping system 50 into a regenerative heater 52 which is disposed flowpathwise intermediate the preheater 38 and the final heater 14 for further warming the liquid product entering the final heater 14. A coil 54 conducts the product through the regenerative heater 52, and a discharge pump 56 expels the spent condensate through a pipe 58 to a sewer or the like.

The final heater 14 comprises a shell 60 which encompasses a coil 62, coil 62 conveying the product being heated and the shell 60 confining the stem or other heating media which enters the heater 14 through an inlet 64. Evaporating steam is supplied under high pressure, as indicated, to a thermocompressor 66 which is connected, as indicated, to the first and second evaporator effects whereby to complete the heat inputs to the multiple-effect evaporator arrangement 10. In compliance with the single-pass forward-feed installation of the evaporator effects 16, the viscosity of the product being concentrated is lowest in the first effect; and the steam temperature and, correspondingly, the product temperature are highest in this first effect which receives fresh steam from the thermocompressor 66. Conversely, the viscosity of the product is highest and the steam temperature lowest in the last evaporator effect from which the vapors are conducted to the preheater 38.

The product which is to be concentrated is introduced into the first evaporator effect from the product feeding arrangement 12; and this product initially enters the system through an inlet line 68 which delivers the product to a closed balance tank 70. The product that is conducted into the system through the product feeding arrangement 12 may be almost any non-salting liquid which it is desired to concentrate. However, the evaporator arrangement 10 is particularly useful for producing top quality concentrated skim milk, whole milk, whey, buttermilk and other food products. In order to elevate liquid from one effect to the next and in order to circulate liquid through the installation, mechanical pumping means are incorporated in the evaporator arrangement 10 at appropriate locations.

Accordingly, the product feeding arrangement 12 is provided with a product pump 72 of the centrifugal type which serves to convey the liquid product from balance tank 70 to a flow control device 74. The product feeding arrangement 12 also includes a product pump 76 which withdraws product from the control device 74 and delivers it under pressure to the coil 40 in vapor-line preheater 38. The pressure developed in the liquid product by the action of pump 76 forces the product not only through the coil 40 but through the coil 54 in the regenerative heater 52 and through the coil 62 of the final heater 14. In addition, this forced flow of the product serves to conduct the product through a coiled holding tube 78 and through a flow diversion valve 80 before it is delivered to the infeed member 28 of the first evaporator effect. In compliance with the invention, flow into the first evaporator effect is regulated by means of a modulating valve 82. The valve 80 is arranged to divert all or part of the product flow from the holding tube 78 to the balance tank 70 through a by-pass line 84 whereby to keep the product flowing and prevent its overheating and burning on the surfaces of the coils in heaters 38, 52 and 14. This ability to divert the flow of product to the first evaporator effect, for example, facilitates minor repairs and adjustments in the several evaporator effects or their auxiliary equipment without requiring a complete shutdown of the installation.

As has been described hereinabove, the liquid product being concentrated in each of the evaporator effects 16 is collected in a sump 34 which drains the corresponding separating chamber 30. In order to lift this collected product to the infeed member 28 of the next succeeding evaporating effect, a product pump 86 is arranged with its inlet coupled in fluid circuit to the sump 34 and with its outlet coupled to the infeed member 28 of the next succeeding effect. Of course, the product pump 86 which is associated with the last evaporator effect does not deliver the concentrated product to a subsequent effect but rather to the discharge line 20. Advantageously, a recycle line 88 communicates the discharge line 20 with the inlet to the product pump 86 which drains the sump from the next to last evaporator effect.

The product pumps 76 and 86 are of the centrifugal type. In compliance with the present invention, therefore, a modulating valve is disposed downstream from each of these pumps; and each of the modulating valves includes a variably positionable valve member which is controlled by the liquid level upstream from the corresponding pump. The valve members are advantageously arranged to regulate flow from the corresponding product pump from a zero value to the maximum flow for the cleaning solutions. The product pump 76 thus is arranged with a liquid level detecting device in the flow control device 74 and with a valve 82 downstream from it, as will be described more fully hereinafter. Similarly, each of the product pumps 86 is associated with a liquid level detecting device located in the corresponding sump 34; and each of these detecting devices is arranged to control a modulating valve 90 disposed in the line leading to the infeed member 28 of the next succeeding effect. In the case of the product pump 86 for the last evaporator effect, the level detecting device controls a modulating valve 92 in the discharge line 20. A manually controlled valve 94 is advantageously disposed in recycle line 88 to select by-passed flow should the product from the final effect be insufficiently concentrated for example.

Referring now to FIGS. 2–2C for a more detailed description of certain elements in the evaporator arrangement 10, the individual evaporator effects are there designated by the numeral 16 together with a suitable suffix letter, the first evaporator effect being distinguished by the suffix letter "a" and succeeding effects being designated by alphabetically succeeding letters. These suffix letters are also attached to the components of each effect.

The product feeding arrangement 12 is shown in greater detail in FIG. 2. There, whole milk is conducted to the balance tank 70 through a modulating valve 96 whose operation is controlled by a liquid level detecting device 98, level detecting device 98 being incorporated with the product tank itself. The level detecting device 98 is of a type which incorporates a float member, and movement of the float member is arranged to operate an intermediate air-pilot valve in compliance with well-known practices. The movement of the float is thus transduced to a pneumatic signal. The air-pilot valve is used to regulate air pressure in a remotely disposed controller, as will be described more fully hereinafter, for varying the position of a plug or valve member in the valve 96 for throttling the flow of raw milk to the product tank 70. The flow control device 74 is also shown in greater detail in FIG. 2; and a modulating valve 100 is interposed between the product pump 72 and the flow control device 74 for regulating the flow of milk to the latter unit. A liquid level detecting device 102 is located in the upper tank 103 of control device 74 and is employed for purposes of operating the valve 100, the level detecting device 104 specifically controlling an intermediate air-pilot valve for transducing the sensed liquid level to a pneumatic signal that can be employed in operating the valve 100. Similarly, a liquid level detecting device 104 is situated in the upper tank of the flow control device 74 to operate an air-pilot valve in regulating the operation of a modulating valve 106, valve 106 being disposed in a water supply line 108. Detecting device 104 is located at a lower level than the detecting device 102 in order to maintain the water valve 106 in closed condition so long as there is a suitable flow of milk from the product pump 72. However, in the event that the liquid level should fall below the detecting device 104, movement of the device is arranged to cause the valve 106 to open admitting water from the line 108. Thus, flow of liquid through the system is insured so as to prevent stationary product from overheating and burning on the surfaces of the equipment and to insure operation of the several pumps in the presence of liquid.

The flow control device 74 is affixed to a post 110 that is mounted in turn on a platform 112, product pump 76 being conveniently mounted on the platform 112 in addition. Furthermore, a liquid level detecting device 114 is disposed in the lower tank 115 of the flow control device 74 to sense the liquid level therein and to prevent the product pump 76 from running dry. The level detecting device 114 operates an intermediate air-pilot valve whose pneumatic output is employed in regulating the operation of modulating valve 82. Level detecting device 114 is capable of insuring operation of the product pump 76 in the constant presence of liquid product. Alternatively, device 114 may be employed in controlling a modulating valve 119 located in the discharge line of pump 76.

A control handle 120 is incorporated in the flow control device 74 for manually adjusting the rate of flow of product through the system by appropriately altering an orifice 121 as, for example, by a needle valve fixed to the lower end of the control handle 120, and which is disposed beneath the liquid level in the lower tank and which controls the flow through a conduit connecting the upper and lower tanks.

It will be recognized that the rate of flow through the installation is therefore a function of both the size of orifice 121 and the static head defined by the difference in liquid levels in the upper and lower tanks. The flow control device 74 thus ensures delivery of a substantially fixed rate from pump 76 irrespective of fluctuations in the pressure of the supply and irrespective of fluctuations in downstream pressure. While product pump 76 has been described as being of the centrifugal type, a positive displacement pump may also be controlled in a similar manner by arranging such a pump with a bypass conduit in the discharge line and by controlling a modulating valve in the bypass conduit using an upstream located level detecting device.

Figure 2A:
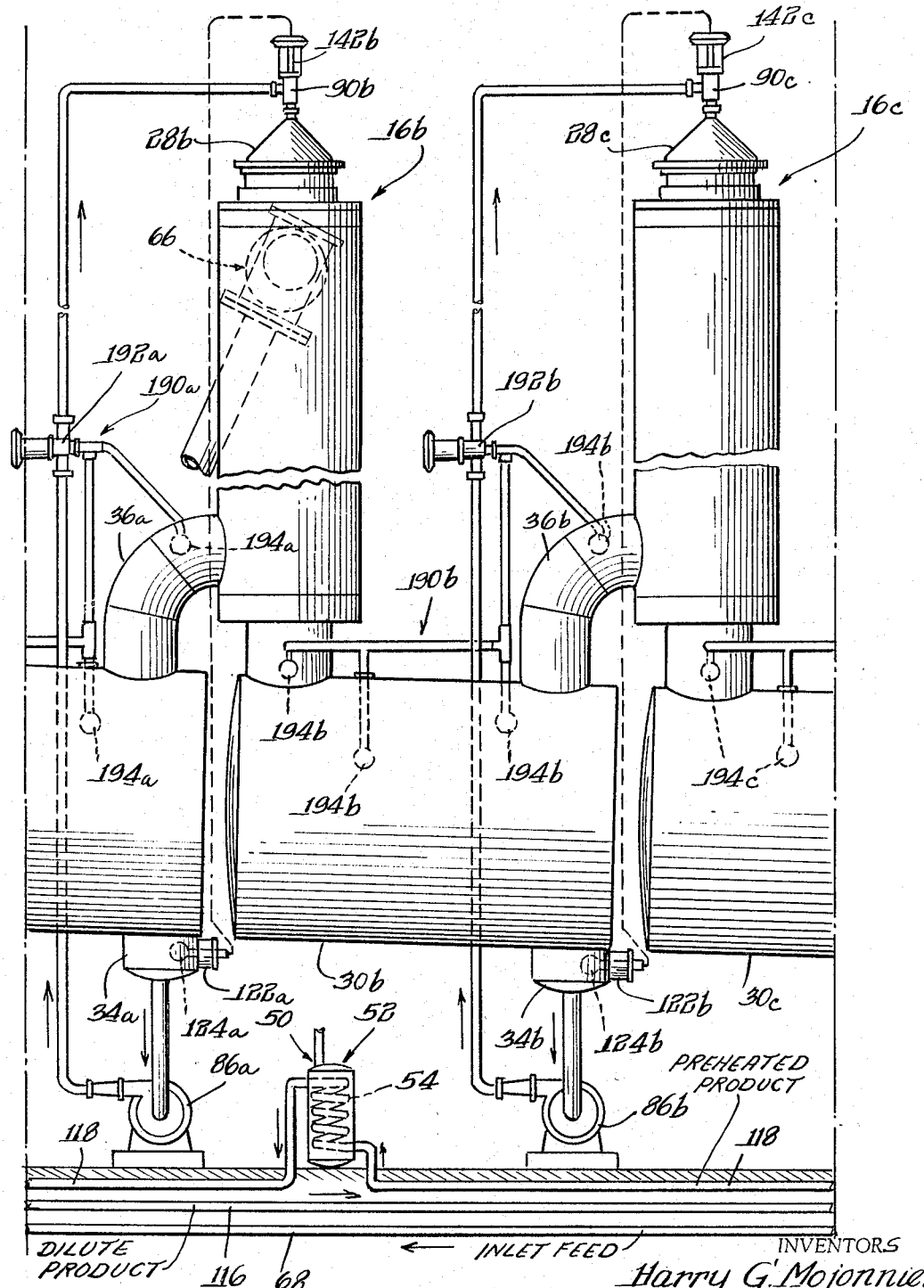
Figure 2B:
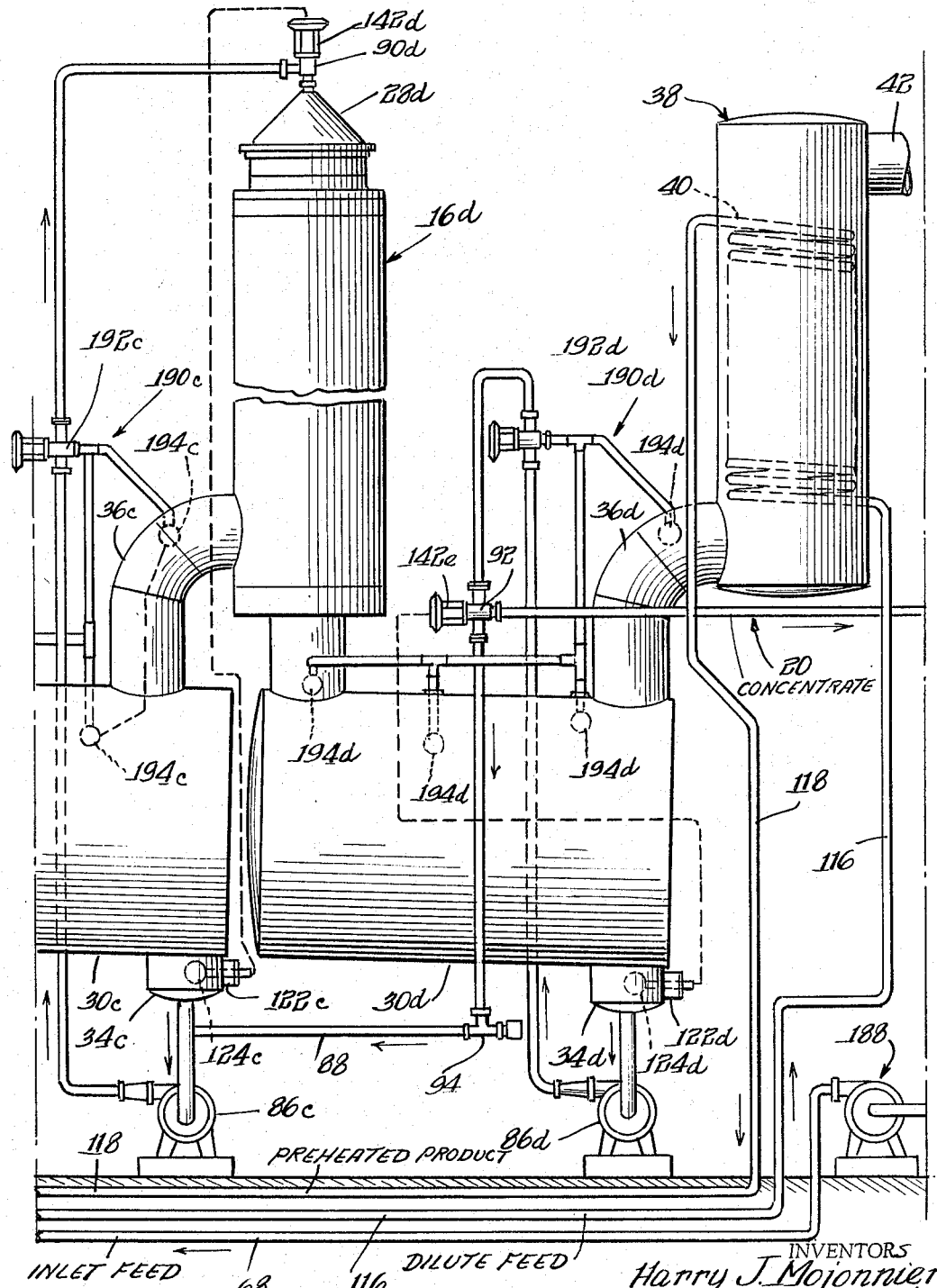

As has been described hereinabove, the modulating valves 90 are individually regulated by a liquid level detecting device disposed in the sump of the preceding evaporator effect. Referring to FIGS. 2A and 2B, a liquid level detecting device 122 is located in each of the sumps 34. The detecting devices 122 are of a type which includes a float member 124 for sensing the liquid level; and turning for the moment to FIG. 3, a typical detecting device 122 will be seen to comprise a housing 126 which is attached to a ferrule plate 128 by a bracket 130. The float 124 is carried by a rod 132 which is pivoted in the ferrule plate and sealed by a rubber bushing 134. A spring bracket member 136 is cantilevered from the ferrule plate 128 and receives the otherwise free end of the float rod 132 in order to operate a tubular air-pilot valve member 138 by means of a screw 140, screw 140 being threadedly connected to the spring bracket 136. Valve member 138 regulates the flow of air to a remotely disposed valve controller 142 by selectively connecting an inlet or suply line 144 and an outlet line 146 whereby to reposition a valve stem 147 which locates an attached valve member 148 with respect to a seat 149. Level detecting devices 98, 102, 104, 114, 164 and 178 and their associated valve controllers are constructed to be similar to the devices 122 and their associated valve controllers 142. Operation of air pilot valve member 138 is as described in detail in applicant's copending application Serial No. 374,684 which was filed June 12, 1964.

In compliance with the features of the present invention, the multiple-effect evaporator installation 10 incorporates a cleaning system 150 shown in FIG. 2C, cleaning system 150 employing substantially the same pumps and flow controls that are employed in directing the product through the installation for concentration. The cleaning system 150 specifically includes a closed balance tank 152 that receives fresh water from a system comprising a supply inlet 154, an elevated, open water balancing tank 156, a line 158, and a modulating valve 160. The operation of valve 160 is regulated by a controller 162 and a float-type liquid level detecting device 164 which is situated in the balance tank 152. When it is desired to mix acid with the water being introduced into the balance tank 152, quantities of a suitable acid are introduced into the water balancing tank 156 from an acid supply tank 166 having a feed control 168. Although the product being concentrated ordinarily makes but a single pass through the evaporator installation 10, it is desirable to recirculate cleaning solutions. Therefore, the product discharge line 20 includes a by-pass valve 170 which is operable to divert the flow from the last evaporator effect to the balance tank 152 through a by-pass line 172. Furthermore, the concentrated product may be discharged from the installation by means of a high pressure pump 174 if desired. It may also be desired to bring the raw product into the evaporator installation 10 through the balance tank 152, using a feed line 176. In such instance, the flow of product is controlled by a float-type liquid level detecting device 178 and a supply modulating valve 180, the operation of valve 180 being regulated by a controller 182 that is regulated in turn by the level detecting device 178. For discharging spent cleaning solution from the installation, a cleaning solution drain valve 184 is situated in the line 176 to discharge the spent cleaning solutions to a sewer through a discharge line 186. Advantageously, a product pump 188 is disposed in the product inlet line 68, as is shown in FIG. 2B, to transfer liquids from balance tank 152 to balance tank 70.

It is desirable to spray the cleaning solutions onto the various surfaces of the separating chambers 30. Therefore, a diversion system 190 is provided with each of the separating chambers 30 to divert liquid flow from the corresponding product pump, as is shown in FIGS. 2–2B. A diversion valve 192 is connected to direct a flow of the cleaning solutions into each of the systems 190, flow being dispensed by nozzles 194 which are focused toward the surfaces contacted by product during the concentration thereof. The valves 192 remain closed while product is flowing through the evaporator installation and are moved to an open position when cleaning solutions are to be directed through the systems.

In use of the evaporator arrangement 10, liquids are circulated by the product pumps 76 and 86. These pumps, being of the centrifugal type, are susceptible of damage upon being operated in the absence of liquid. In compliance with the invention, however, operation of these pumps in the continued presence of liquid is insured by means of the valves 82, 90 and 92 which are disposed downstream from the corresponding product pump. Moreover, these valves are operated by a liquid level detecting device disposed upstream from the corresponding pump. Thus, when the infeed to the pump falls below a preselected liquid level, the detecting device operates the related valve to reduce flow and permit the liquid supply to catch up with the delivery of the pump. Conversely, when the infeed to the pump rises above the preselected liquid level, the detecting device operates the related valve to increase the flow. So long as the level of infeed liquid remains at the preselected level, the corresponding valve is maintained at a preselected orifice opening for passing the liquid at a selected rate. Accordingly, substantially unvarying rates of flow of product pass through the evaporator installation and substantially greater rates of flow of cleaning liquids can be circulated through the installation merely by resetting the orifice 121 using handle 120.

Other than this matter of controlling the flow through the product pumps, the operation of evaporator arrangement 10 proceeds in the customary manner for concentrating the infed product. With respect to the clean-up operation, after the steam is turned off and after the flow of milk or other product is terminated by closing the valve 180, the entire evaporator system is flushed with water from the inlet 154, valves 192 being opened to activate nozzles 194 and flush water being passed to the sewer through drain valve 184 and drain line 186. In continuation of the flow of flush water, caustic soda may be introduced into the water balance tank 156 in order to develop a solution for removing product burn-on or milkstone from the interior surfaces of the equipment. The drain valve 184 is closed to permit recirculation of the caustic solution. Thereafter, fresh water is employed to chase the caustic solution out of the system and into the sewer through the line 186. Acid is then introduced into the water balance tank 156 to form a solution for neutralizing residual caustic and polishing the equipment to rid it of scum. A final rinse of fresh water is usually employed. During concentration of the product and during the cleaning cycle, the level detecting devices 122 and the controlled valves 82, 90 and 92 insure operation of the various product pumps in the presence of liquid for protecting them.

The specific examples herein shown and described are to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. Flow controlled apparatus comprising: first container means for receiving a variable flow of a selected liquid; flow regulating means for maintaining a selected level of liquid in said first container means; second container means underlying said first container means; first conduit means communicating the liquid-containing portion of said first container means with said second container means; orifice means in said first conduit means opening below the liquid level in said second container means; second conduit means for passing a forced flow of said liquid; a pump connected in fluid circuit between said second container means and said second conduit means, the inlet of said pump being coupled to said second container means and the outlet of said pump being coupled to said second conduit means for delivering said forced flow; valve means connected in fluid circuit in said second conduit means, including a valve member for modulating the flow of liquid passing from said second container means from substantially zero flow to a predetermined maximum flow; and control means for selectively operating said valve means in accordance with the level of liquid in said second container means, including sensor means detecting the level of liquid in said second container means and varying the position of said valve member in accordance with the liquid level in said second container means, whereby to throttle the flow of liquid to said second conduit means thereby preventing said pump from operating in the absence of liquid and whereby to establish a substantially uniform rate of flow through said second conduit means.

2. Flow controlled apparatus comprising: first container means for receiving a variable flow of a selected liquid; first flow regulating means for maintaining a selected level of liquid in said first container means; second container means gravitationally underlying said first container means; first conduit means communicating the liquid-containing portion of said first container means with said second container means; orifice means in said first conduit means opening below the liquid level in said second container means; second conduit means for passing a flow of said liquid from said second container means; and second flow regulating means for maintaining a selected level of liquid in said second container means, whereby the flow through said second conduit means is determined by the size of the opening of said orifice means and the fluid head between said first and second container means for ensuring a substantially uniform overall flow.

3. Flow controlled apparatus comprising: first container means for receiving a variable flow of a selected liquid; first flow regulating means for maintaining a selected level of liquid in said first container means; second container means gravitationally underlying said first container means; first conduit means communicating the liquid-containing portion of said first container means with said second container means; variable orifice means in said first conduit means opening below the liquid level in said second container means; regulating means for said variable orifice means; second conduit means for passing a flow of said liquid from said second container means; and second flow regulating means for maintaining a selected level of liquid in said second container means, whereby the flow through said second conduit means is determined by the size of the opening of said orifice means and the fluid head between said first and second container means for ensuring a substantially uniform overall flow.

4. A flow controlled evaporator of the multiple effect type comprising: first supply means for a liquid material to be concentrated as it is passed through the effects of an evaporator; second supply means for a cleaning liquid to be circulated through the effects of the evaporator at a substantially greater rate of flow than said product at a time when said liquid product is not in process; first tank means for receiving a variable flow from one of said supply means; flow regulating means for maintaining a selected level of liquid in said first tank means; second tank means connected to said first tank means; first conduit means communicating the liquid-containing portion of said first tank means with said second tank means; orifice means in said first conduit means opening below the liquid level in said second tank means; second conduit means for passing a forced flow of liquid; a first pump connected in fluid circuit between said second tank means and said second conduit means, the inlet of said pump being coupled to said second tank means and the outlet of said pump being coupled to said second conduit means for delivering said forced flow; first valve means connected in fluid circuit in said second conduit means, including a valve member for modulating the flow of liquid passing from said second tank means from substantially zero flow to a predetermined maximum flow; first control means including sensor means detecting the level of liquid in said second tank for moving said valve means toward closed or opened positions upon the level of liquid in said second tank means falling below or rising above a selected level, respectively, whereby to throttle the flow of liquid to said second conduit means thereby preventing said pump from operating in the absence of liquid and whereby to establish a substantially uniform rate of flow through said second conduit means; a first evaporator effect including separating chamber means adapted to receive a flow of the liquid product and vapors therefrom and having a sump for collecting liquid, said effect further including a diversion valve, and an infeed conduit for supplying said liquid and containing said diversion valve, said diversion valve selectively by-passing said infeed conduit and diverting the said liquid to the first tank means in accordance with demands of the first control means; a second evaporator effect including second infeed conduit connected to said sump; a second pump connected in fluid circuit between said sump and the infeed conduit of said second effect for selectively delivering liquid product or cleaning liquid to said second effect; second valve means connected in fluid circuit between said second pump and the infeed conduit of said second effect, including a variably positionable valve member for modulating the flow of liquid from said sump from substantially zero flow to the maximum flow for said cleaning liquid; second control means for said second valve means for detecting the level of liquid in said sump and varying the position of said variably positionable valve member in accordance with the level in said sump whereby to throttle the flow of liquid to said second effect upon said sump level falling and thereby preventing said second pump from operating in the absence of liquid.

5. A flow controlled evaporator in accordance with claim 4 which further comprises spray means disposed in said separating chamber means, focused to direct cleaning liquid onto surfaces contacted by the liquid product, said spray means being connected in fluid circuit between said second pump and the infeed conduit of said second effect for receiving a forced flow of cleaning liquid.

References Cited by the Examiner

UNITED STATES PATENTS

| | | | |
|---|---|---|---|
| 378,843 | 2/1888 | Lillie | 159—44 X |
| 484,831 | 10/1892 | Stillman | 159—17 |
| 2,168,362 | 8/1939 | Peebles et al. | 159—17 |
| 2,576,496 | 11/1951 | Ziegler | 159—44 X |
| 2,734,565 | 2/1956 | Lockman | 159—20 |
| 2,750,999 | 6/1956 | DeVries | 159—18 |
| 2,781,089 | 2/1957 | Mair et al. | 159—20 |
| 2,796,120 | 6/1957 | Lockman et al. | 159—20 X |
| 3,102,062 | 8/1963 | Graham et al. | 159—44 X |

FOREIGN PATENTS 202,722   7/1956   Australia.

NORMAN YUDKOFF, *Primary Examiner.*

J. SOFER, *Assistant Examiner.*